US012759709B2

(12) United States Patent
Woodington et al.

(10) Patent No.: US 12,759,709 B2
(45) Date of Patent: Oct. 13, 2026

(54) BASE UNIT

(71) Applicants: Safran Seats GB Limited, Cwmbran (GB); Safran Seats, Plaisir (FR)

(72) Inventors: James Woodington, Cwmbran (GB); Gerald Cotta, Plaisir (FR)

(73) Assignees: Safran Seats GB Limited, Cwmbran (GB); Safran Seats, Plaisir (FR)

( * ) Notice: Subject to any disclaimer, the term of this patent is extended or adjusted under 35 U.S.C. 154(b) by 0 days.

(21) Appl. No.: 18/755,528

(22) Filed: Jun. 26, 2024

(65) Prior Publication Data

US 2025/0002155 A1 Jan. 2, 2025

(30) Foreign Application Priority Data

Jun. 28, 2023 (EP) .................................... 23306053

(51) Int. Cl.
*B64D 11/06* (2006.01)

(52) U.S. Cl.
CPC ...... *B64D 11/0605* (2014.12); *B64D 11/0606* (2014.12)

(58) Field of Classification Search
CPC . B64D 11/06; B64D 11/0605; B64D 11/0602; B64D 11/0627; B64D 11/0646
See application file for complete search history.

(56) References Cited

U.S. PATENT DOCUMENTS

| | | | | |
|---|---|---|---|---|
| 11,161,614 | B2 | 11/2021 | Schuttera et al. | |
| 2003/0222174 | A1* | 12/2003 | Saint-Jalmes | B60R 7/043 244/118.1 |
| 2015/0202992 | A1* | 7/2015 | Cailleteau | B60N 2/015 297/248 |
| 2018/0148176 | A1* | 5/2018 | Rodriguez | B64D 11/0638 |
| 2021/0114735 | A1* | 4/2021 | Ozaki | B60N 2/01575 |
| 2021/0229813 | A1 | 7/2021 | Glain | |
| 2023/0331128 | A1* | 10/2023 | Mansouri | B60N 2/70 |

OTHER PUBLICATIONS

Qi et al., Advanced honeycomb designs for improving mechanical properties: A review, Dec. 15, 2021, Composites Part B: Engineering, vol. 227, found at [https://doi.org/10.1016/j.compositesb.2021.109393] (Year: 2021).*
Europe Appl. No. 23306053.2, Search Report, dated Dec. 14, 2023, 8 pages.

* cited by examiner

*Primary Examiner* — Justin Michael Heston
(74) *Attorney, Agent, or Firm* — Kilpatrick Townsend & Stockton LLP

(57) ABSTRACT

The present invention provides a base unit for an aircraft seat unit, the base unit comprising: a frame comprising at least one elongate member; a panel; wherein the frame and the panel are mechanically connected to one another, such that the frame and the panel provide a mounting structure for an aircraft seat; and the frame and the panel define a storage space which is accessible to a user of the aircraft seat unit.

14 Claims, 4 Drawing Sheets

BASE UNIT

CROSS-REFERENCE TO RELATED APPLICATION

The present application claims priority to Europe patent application Ser. No. 23/306,053.2, filed on Jun. 28, 2023, the entire contents of which are herein incorporated by reference in their entirety for all purposes.

FIELD OF THE INVENTION

The present invention concerns a base unit for an aircraft seat unit. More particularly, but not exclusively, this invention concerns a base unit for an aircraft seat unit that provides useful storage space.

BACKGROUND OF THE INVENTION

Typically, aircraft seat units, and in particular business class and first class seat units, include a plinth that supports the aircraft seat of the aircraft seat unit, and also secures the aircraft seat unit to the floor of the aircraft cabin. In order that sufficient support is provided to the aircraft seat, and also to ensure a suitable connection with the floor of the aircraft cabin, the plinths are often heavy and take up a significant amount of space. The present invention seeks to mitigate the above-mentioned problems. Alternatively or additionally, the present invention seeks to provide an improved base unit for an aircraft seat unit which may be lighter weight than prior art base units, and/or may provide more storage space than prior art base units.

SUMMARY OF THE INVENTION

The present invention provides, according to a first aspect, a base unit for an aircraft seat unit, the base unit comprising:

a frame comprising at least one elongate member;

a panel;

wherein the frame and the panel are mechanically connected to one another, such that the frame and the panel provide a mounting structure for an aircraft seat; and the frame and the panel define a storage space which is accessible to a user of the aircraft seat unit.

Advantageously, the invention provides a base unit for an aircraft seat unit which may be lighter than conventional plinths. Also, the base unit is configured such that a storage space is defined within the base unit, which may be used by a passenger to store a bag or other luggage that would otherwise need placing in an overhead locker. As such, the present invention may be used to provide more in-cabin storage for passengers, or may allow over-head lockers to be removed from aircraft cabin, potentially providing a more spacious feeling cabin.

The mechanical connection between the frame and the panel may be any suitable mechanical connection as would be well known by the person skilled in the art, including but not being limited to mechanical fasteners, welding, adhesive or interlocking interfaces.

The at least one elongate member may comprise a metal material, for example aluminium. The at least one elongate member may be extruded. The at least one elongate member may comprise a hollow tube. The at least one elongate member may have a circular, U-shaped, square, rectangular, or semi-circular cross-section. The at least one elongate member may have a cross-section that varies depending on the expected loads on individual points of the elongate member. The at least one elongate member may vary in thickness depending on the expected loads on individual points of the elongate member. The at least one elongate member may have a constant or varied cross section with local reinforcement positioned depending on the expected loads on individual points of the elongate member.

The frame may comprise a first elongate member and second elongate member. The first elongate member may be mechanically attached to the second elongate member by the panel. The panel may comprise a honeycomb structure, for example a metallic, for example aluminium, honeycomb structure. The honeycomb structure may increase the structural rigidity of the panel compared to a panel which does not comprise a honeycomb structure. The honeycomb structure may be an advantageous way to increase the structural rigidity of the panel without significantly increasing the weight of the panel. The panel may comprise aluminium, or other metal, or fibre glass, or carbon fibre, or other fibre. The panel may comprise a composite material, for example a honeycomb composite panel or other material as "Nomex <RTM>" for example. The panel may be perforated in order to save weight and/or increase passenger comfort by creating an acoustic resonator network for absorbing some cabin noise waves.

The elongate member may be a single piece of material shaped to provide an approximately rectangular aperture. Alternatively the elongate member may comprise a plurality of components, for example straight rods and curved corner connectors, joined together to provide an approximately rectangular aperture. The elongate member may comprise reinforcement at points where loading will be particularly high. The elongate member may comprise one or more connection points to facilitate mechanical engagement with the panel.

The base unit may comprise a plurality of panels, for example a first side panel, a second side panel, and a base panel. The base unit may comprise a seat connection panel. The base unit may comprise a panel located to provide a shelf or support level within the storage space.

The base unit may comprise one or more connection points, the connection points configured to enable an aircraft seat to be connected to the base unit. The connection points may additionally or alternatively be configured to enable a shell or shroud to be connected to the base unit. The base unit may comprise one or more connection points configured to enable the connection of a seat belt or seat belt mounting points. The base unit may comprise one or more connection points configured to enable the connection of the base unit to a floor of an aircraft cabin, for example utilising the conventional mounting points and/or mounting rails provided in many aircraft cabins. The connection points may be located on a seat connection panel spaced above the bottom of the base unit. The seat connection panel may also function as a shelf or support panel which acts to define the storage space within the base unit. The panel may be interchangeable, for example allowing panels with different configurations of connection points to be used depending on the connection points on the seat unit which is to be connected to the base unit.

The base unit may comprise bracing configured to further increase the structural rigidity and/or strength of the base unit. The bracing may be connected to the at least one elongate member and/or the panel or panels. The bracing may provide one or more connection points configured to enable an aircraft seat to be connected to the base unit. Provision of the connection points directly on the bracing may increase the strength and/or structural rigidity of the aircraft seat to base unit connection.

The base unit may comprise a console panel mounted to an upper portion of the base unit. The console panel may further increase the structural rigidity and/or strength of the base unit. The console panel may be configured to provide an armrest and/or table, and/or storage options for a passenger.

The base unit may comprise one or more fascias or screens to hide structural elements of the base unit from a passenger. The screen or screens may be removable for improving ease of installation of the base unit, and/or to allow for maintenance of the base unit. The screen or screens may be removable and replaceable with alternative screens, for example to change the visual appearance of the base unit. The screen or screens may comprise a decorative film without perforation, or perforated in order to improve sound transparency.

The base unit may comprise a panel of perforated metal, for example perforated aluminium, the panel positioned to further improve the structural rigidity and/or strength of the base unit.

According to a second aspect of the invention, there is provided an aircraft seat unit, the aircraft seat unit comprising a base unit according to the first aspect of the invention, and an aircraft seat mounted to the base unit. The bracing and/or seat connection panel described with reference to the first aspect of the invention may support the seat mechanism or support directly a seat cushion of the aircraft seat. The base unit may comprise one or more connection points located on a seat connection panel and/or bracing, and the aircraft seat may be connected to the connection points. The aircraft seat may comprise a cushion, the cushion being directly connected to the one or more connection points located on the seat connection panel and/or bracing. The aircraft seat may further comprise a shell or shroud mounted to the base unit. The shell or shroud may increase the privacy of a passenger using the aircraft seat unit.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
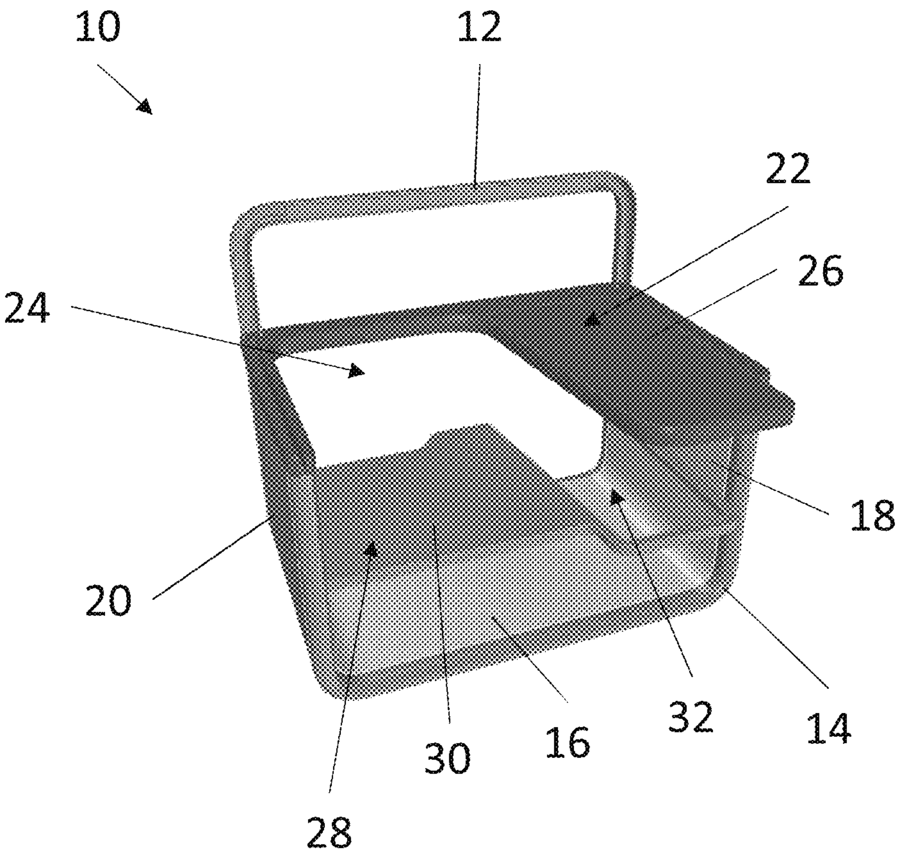
FIG. 1 shows a schematic view of a base unit according to a first embodiment of the invention.
Figure 2:
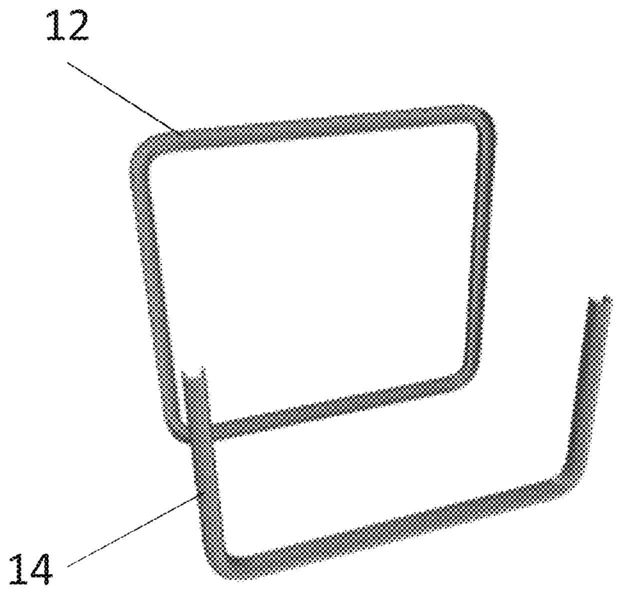
FIG. 2 shows the base unit of FIG. 1, with all components removed other than the elongate members.

FIG. 1 shows a base unit 10 for an aircraft seat unit. The base unit comprises a frame with a first elongate member 12 and a second elongate member 14. The first elongate member 12 is an extruded aluminium tube with a circular cross-section, shaped into an approximately rectangular shape. The second elongate member 14 is an extruded aluminium tube with a circular cross-section, shaped into an open topped U shape. This is best shown in FIG. 2, where other elements of the base unit 10 have been removed. In this embodiment, the first elongate member 12 comprises four straight sections secured into four curved corner sections. The second elongate member 14 comprises three straight sections secured into two curved corner sections. The first elongate member 12 and second elongate member 14 extend in parallel planes, spaced apart from one another. The first elongate member 12 is located at what is considered the back of the base unit 10, and the second elongate member 14 is located at what is considered the front of the base unit 10. A base panel 16 comprising an aluminium honeycomb construction is located at the base of the base unit 10, and connects the first elongate member 12 to the second elongate member 14. A left side panel 18 comprising an aluminium honeycomb construction is located to the left side of the base unit 10 and connects the first elongate member 12 to the second elongate member 14. A right side panel 20 comprising an aluminium honeycomb construction is located to the right side of the base unit 10 and connects the first elongate member 12 to the second elongate member 14. The left side and right side are determined with reference to the direction in which a passenger will be facing when sitting in the seat connected to the base unit 10, which will be forwards with respect to the front of the base unit 10. A console panel 22 is connected towards the top of the base unit 10, including an open section 24 which is configured to allow a seat to be joined to the base unit and provide space for a passenger to sit in the seat, and a side section 26 which acts both as an armrest for a passenger and also a small table for supporting drinks, snacks, and other items as chosen by the passenger. A seat connection panel 28 is provided midway up the base unit 10, with a support section 30 configured to provide connection points for a seat, and an open section 32 configured to allow a passenger in a seat unit behind the base unit 10 to place their feet. The open section 32 is located approximately underneath the side section 26 in order to effectively utilise the free space under the side section 26, in particular the increased height available for a passenger to rest their feet. There is an approximately cuboidal free space underneath the support section 30 and the base panel 16, which may be accessed either from the front or rear of the base unit 10, and into which a passenger may slide a suitably sized suitcase. In an alternative embodiment, the free space may include a barrier located towards either the first elongate member 12 or second elongate member 14, the barrier restricting access to the free space from one or other side of the base unit. This may improve the security luggage stored in the free space during flight.

Figure 3:
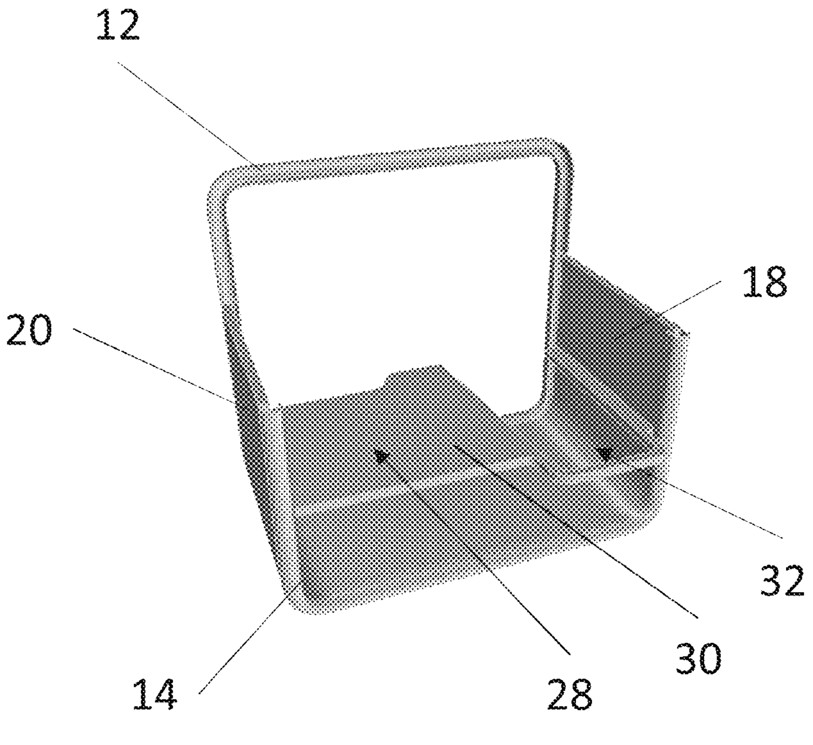
FIG. 3 shows the base unit of FIG. 1 with the console panel removed.

FIG. 3 shows the base unit 10 with the console panel 22 removed in order to provide a better view of the internal space within the base unit 10.

Figure 4:
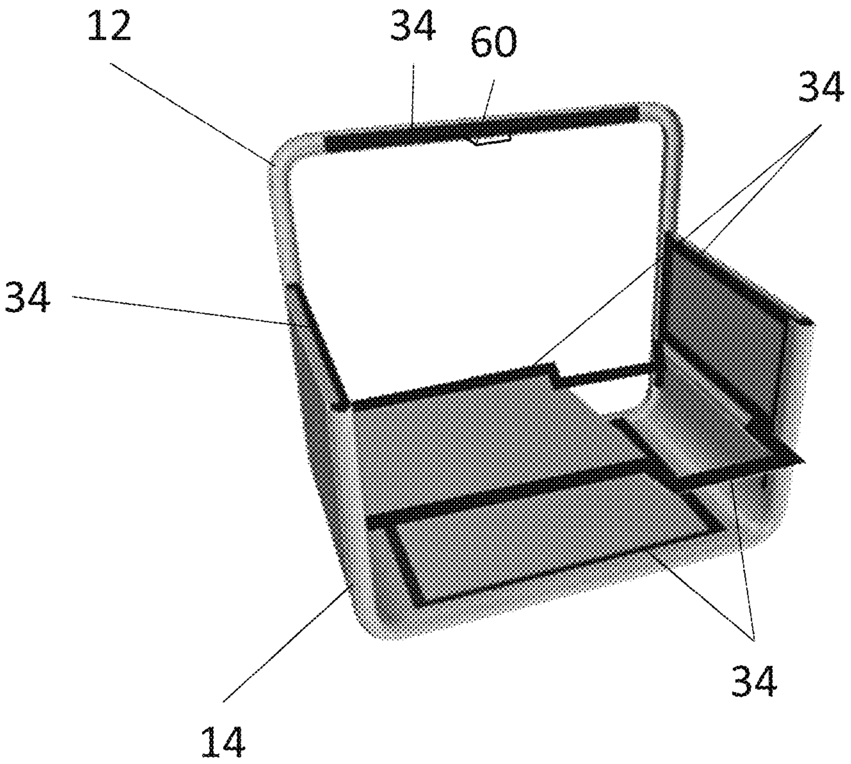
FIG. 4 shows the base unit of FIG. 1 with the console panel removed and various bracing members shown.
Figure 5:
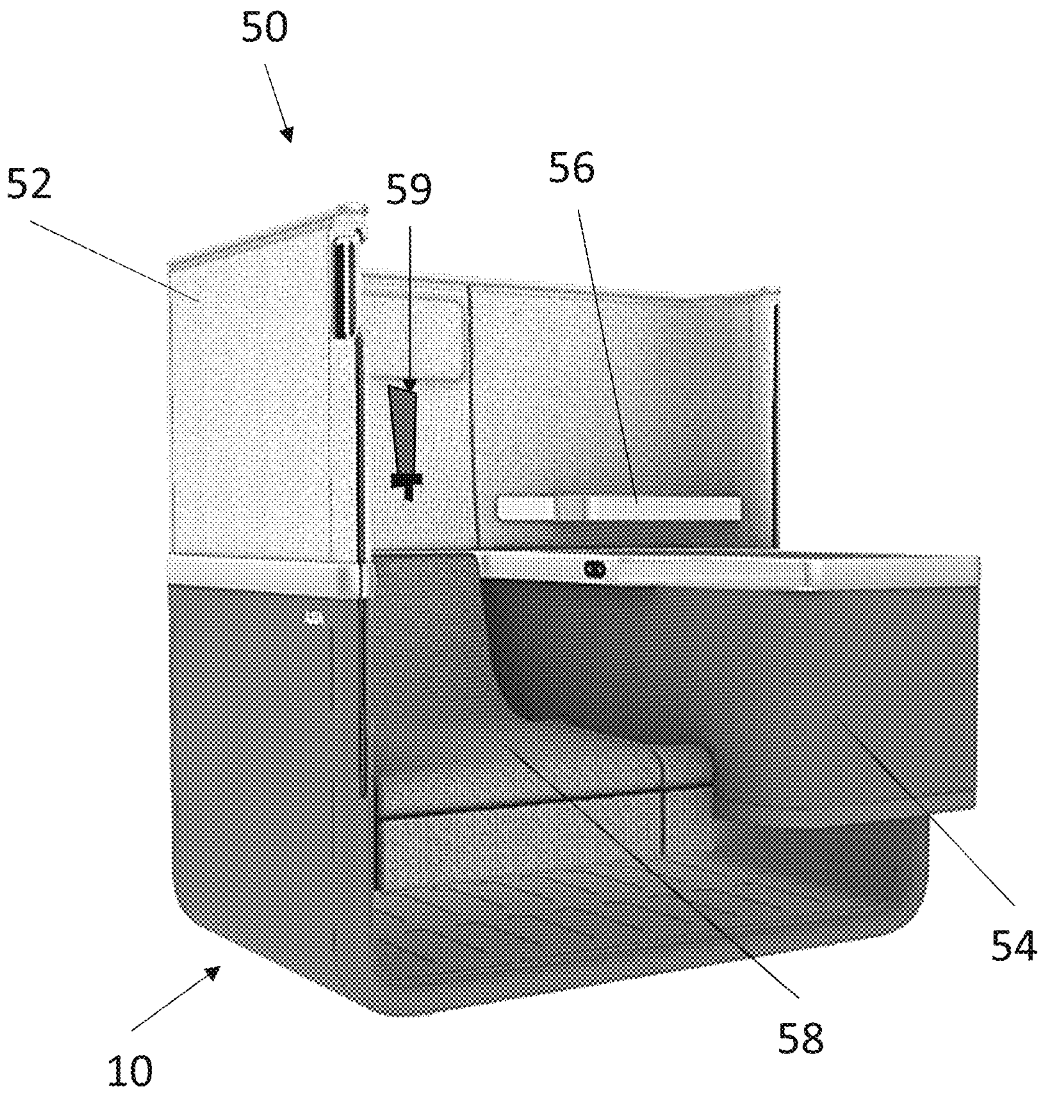
FIG. 5 shows an aircraft seat unit comprising a base unit as shown in FIG. 1.

FIG. 4 shows where various braces 34 are added, connecting various elements of the base unit 10 together, and further increasing the structural rigidity and strength of the base unit 10. The brace 34 added to the member 12 may help to support the third seat belt point load In this case, an additional part 60 for guiding the safety belt can be added in the form of a bent wire welded to the reinforcement 34 for example. FIG. 5 shows an aircraft seat unit 50, which includes a base unit 10 as described above. A shell 52 is mounted to the top part of the base unit 10 and extends around the seating area of a passenger in order to give them increased privacy. A console shell 54 is provided underneath the side section 26 of the console panel 22, screening off the space underneath the side section 26 to allow a passenger sitting behind the seat unit 50 to place their feet within the free space without encroaching on the space of a passenger sitting in the seat unit 50. A small shelf 56 extends from the shell 52 and may be used by a passenger to store small personal items. A seat 58 is mounted to the support portion 30 of the shelf panel 28. Various fascias have been attached to the base unit 10 in order to screen off the internal structure of the base unit 10. This improves the visual appearance of the base unit 10 and also protects the internal structure from damage. A third seat belt 59 is also shown in FIG. 5.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the embodiments described above, the frame and the panels have been constructed of several individual components joined together. In an alternative embodiment, the elongate members may be single components extruded or otherwise formed, bent, and potentially welded or bonded into position. In a further alternative embodiment the panels may be curved or otherwise shaped to reduce the number of separate components needed. For example, the front panel, right panel, and left panel, may all be formed from a single sheet of material cut and bent into the right shape. In an alternative embodiment, the elongate member 12 may be connected to a perforated metal panel which extends upwards from the elongate member 12, the perforated metal panel acting as a support for a shell extending around the aircraft seat unit. In an alternative embodiment, the right panel and/or left panel may include a slot, the slot configured to house a sliding door which may be moved out of the slot in order to increase passenger privacy once they are using the aircraft seat unit.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A base unit for an aircraft seat unit, the base unit comprising: a frame comprising a first elongate member and a second elongate member, wherein the first elongate member is a first tube elongated into a first shape and the second elongate member is a second tube elongated into a second shape, wherein the first shape and the second shape are different shapes; a panel connecting the first elongate member and the second elongate member; wherein the frame and the panel are mechanically connected to one another, such that the frame and the panel define a mounting structure for an aircraft seat and such that the aircraft seat is on a first side of the panel; and wherein the frame and the panel define a storage space on a second side of the panel and below the mounting structure, wherein the base unit comprises a forward side and a rear side opposite from the forward side, wherein the mounting structure extends between the forward side and the rear side, wherein at least one of the forward side or the rear side of the base unit defines an opening to the storage space, and wherein the storage space is approximately cuboidal, and wherein the first elongate member is elongated into the first shape at the rear side of the base unit and the second elongate member is elongated into the second shape at the forward side of the base unit.

2. The base unit of claim 1, wherein the at least one elongate member comprises a metal material.

3. The base unit of claim 1, wherein the at least one elongate member is extruded.

4. The base unit of claim 1, wherein the panel comprises a honeycomb structure.

5. The base unit of claim 1, wherein panel is a first panel of the base unit comprises a plurality of panels.

6. The base unit of claim 1, further comprising one or more connection points, the connection points configured to enable an aircraft seat to be connected to the base unit.

7. The base unit of claim 1, further comprising a seat connection panel.

8. The base unit of claim 1, further comprising bracing configured to further increase a structural rigidity and/or a strength of the base unit.

9. The base unit of claim 1, comprising one or more connection points being located on a seat connection panel and/or bracing, the connection points configured to enable an aircraft seat to be connected to the base unit.

10. The base unit of claim 1, further comprising a console panel mounted to an upper portion of the base unit the console panel configured to provide an armrest and/or table, and/or storage options for a passenger.

11. The base unit of claim 1, further comprising one or more screens to hide structural elements of the base unit from a passenger.

12. An aircraft seat unit, the aircraft seat unit comprising a base unit according to claim 1, and an aircraft seat mounted to the base unit.

13. An aircraft seat unit according to claim 12, wherein the base unit comprises one or more connection points located on a seat connection panel and/or bracing, and the aircraft seat is connected to the connection points.

14. A base unit for an aircraft seat unit, the base unit comprising:

a frame comprising a first elongate member and a second elongate member, wherein the first elongate member is a first tube elongated into a first shape and the second elongate member is a second tube elongated into a second shape, wherein the first shape is a rectangular shape and the second shape is a U shape;

a panel connecting the first elongate member and the second elongate member;

wherein the frame and the panel are mechanically connected to one another, such that the frame and the panel define a mounting structure for an aircraft seat and such that the aircraft seat is on a first side of the panel; and wherein the frame and the panel define a storage space below the panel of the mounting structure and which is approximately cuboidal and accessible to a user of the aircraft seat unit from a front side and/or a rear side of the base unit, and wherein the frame and the panel further defines an open section with an opening defined on a rear side of the base unit, wherein the open section is configured to allow a rear side passenger to place their feet within the open section, and wherein the first elongate member is elongated into the first shape at the rear side of the base unit and the second elongate member is elongated into the second shape at the front side.

* * * * *